United States Patent
Milicevic et al.

(10) Patent No.: US 9,663,394 B2
(45) Date of Patent: May 30, 2017

(54) METHOD FOR MANUFACTURING AN OPTICAL PREFORM

(71) Applicant: Draka Comteq B.V., Amsterdam (NL)

(72) Inventors: Igor Milicevic, Amsterdam (NL); Gertjan Krabshuis, Amsterdam (NL); Peter Gerharts, Amsterdam (NL); Johannes Antoon Hartsuiker, Amsterdam (NL); Mattheus Jacobus Nicolaas van Stralen, Amsterdam (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 14/716,127

(22) Filed: May 19, 2015

(65) Prior Publication Data
US 2015/0336841 A1 Nov. 26, 2015

(30) Foreign Application Priority Data

May 22, 2014 (NL) ...................... 2012868

(51) Int. Cl.
C03B 37/018 (2006.01)
C03B 37/07 (2006.01)
C03B 37/012 (2006.01)

(52) U.S. Cl.
CPC ............ *C03B 37/07* (2013.01); *C03B 37/018* (2013.01); *C03B 37/0124* (2013.01); *C03B 37/01248* (2013.01); *C03B 37/01861* (2013.01); *C03B 37/01869* (2013.01); *C03B 2203/00* (2013.01)

(58) Field of Classification Search
None
See application file for complete search history.

(56) References Cited

U.S. PATENT DOCUMENTS

| 4,165,224 A * | 8/1979 | Irven ................. C03B 37/01853 65/110 |
| 4,360,250 A * | 11/1982 | Payne ................... C03B 23/047 385/124 |
| 9,151,889 B2 * | 10/2015 | Dong ................ C03B 37/01217 |
| 2004/0247269 A1 * | 12/2004 | Hirano .............. C03B 37/01211 385/123 |
| 2007/0175242 A1 * | 8/2007 | Hirano .............. C03B 37/01807 65/379 |
| 2008/0240663 A1 * | 10/2008 | Dong ................ C03B 37/01211 385/125 |
| 2013/0081430 A1 * | 4/2013 | Oozeki ............. C03B 37/01861 65/419 |

(Continued)

FOREIGN PATENT DOCUMENTS

EP 0 134 743 A1 3/1985

*Primary Examiner* — Jodi C Franklin
(74) *Attorney, Agent, or Firm* — Shumaker, Loop & Kendrick, LLP

(57) ABSTRACT

A method for manufacturing an optical preform including the steps of providing a substrate tube having deposited layers of glass on an inside surface thereof, increasing an outer diameter of the substrate tube by means of applying a traversing heat source to heat the substrate tube to above a softening temperature thereof and by providing an internal pressure in the substrate tube higher than an ambient pressure, and collapsing the substrate tube of increased outer diameter by means of applying the traversing heat source to heat the substrate tube to above the softening temperature thereof such that an optical preform is manufactured.

11 Claims, 2 Drawing Sheets

(56) References Cited

U.S. PATENT DOCUMENTS

2014/0157829 A1* 6/2014 Milicevic ............ C03B 37/0183
                                                      65/391
2015/0239768 A1* 8/2015 Jiang ................. C03B 37/01211
                                                      65/412

* cited by examiner

METHOD FOR MANUFACTURING AN OPTICAL PREFORM

TECHNICAL FIELD AND BACKGROUND OF THE INVENTION

The present invention relates to a method for manufacturing an optical preform including the steps of providing a substrate tube having deposited layers of glass, on the inside surface thereof, and collapsing the substrate tube by means of applying a traversing heat source to heat the substrate tube to above its softening temperature such that an optical preform is manufactured.

Generally, in the field of optical fibers, multiple thin films of glass are deposited on the inside surface of a substrate tube. Glass-forming gases (viz. doped or undoped reactive gases) are introduced into the interior of the substrate tube from one end (supply side of the substrate tube). Doped or undoped glass layers are deposited onto the interior surface of the substrate tube. The gases are discharged or removed from the other end of the substrate tube, optionally by the use of a vacuum pump (discharge side of the substrate tube). The vacuum pump has the effect of generating a reduced pressure in the interior of the substrate tube, which reduced pressure generally comprises a pressure value ranging between 5 and 50 mbar.

Several internal vapour deposition processor may be used, such as MCVD, Modified Chemical Vapour Deposition, PCVD, Plasma Chemical Vapour Deposition. The present invention is applicable to all types of internal vapour deposition processes. Hereafter, PCVD is explained in more detail.

Generally, electromagnetic radiation, preferably microwaves, from a generator are directed towards an applicator via a waveguide, which applicator surrounds a substrate tube. The applicator couples the electromagnetic radiation into the plasma. The applicator (and hence the plasma formed by that) is moved reciprocally in the longitudinal direction of the substrate tube, as a result of which a thin glass layer is deposited onto the interior of the substrate tube with every stroke or pass.

The applicator and the substrate tube are generally surrounded by a furnace so as to maintain the substrate tube at a temperature of 900-1300° C. during the deposition process.

When the number of passes increases the cumulative thickness of these thin films, i.e. of the deposited material, increases thus leading to a decrease in the remaining internal diameter of the substrate tube. In other words, the hollow space inside the substrate tube keeps getting smaller with each pass.

After the glass layers have been deposited onto the interior of the substrate tube, the substrate tube, also called precursor to a primary preform, is subsequently contracted by means of heating into an optical preform, i.e. solid rod. This is called a collapsing process. The remaining solid rod is also called a primary preform.

During the collapsing process, usually, a deposited tube (viz. a substrate tube having deposited layers of glass on the inside surface thereof) is being contracted in a contraction machine to an optical preform, utilizing a heat source. Such a machine is generally known as a collapsing device. The collapsing device comprises a heat source that can heat the substrate tube to a temperature higher than the softening temperature of said substrate tube, generally above 2000° C. Suitable heat sources for collapsing the substrate tube include hydrogen/oxygen burners, plasma burners, electrical resistance furnaces, and induction furnaces. However, the present invention is not limited to a specific type of heat source.

After said step of collapsing, in a special embodiment, the solid rod or primary preform may furthermore be externally provided with an additional amount of glass, for example by means of an external vapour deposition process or direct glass overcladding (so-called "overcladding") or by using one or more preformed glass tubes (so-called "sleeving"), thus obtaining a composite preform called the final preform. From the final preform thus produced, one end of which is heated, optical fibres are obtained by drawing on a drawing tower. The refractive index profile of the consolidated (final) preform corresponds to the refractive index profile of the optical fibre drawn from such a preform.

From U.S. Pat. No. 4,869,743 a method of manufacturing a fibre is known by drawing a preform, wherein the preform is made by collapsing a thick-walled silica tube having a reduced pressure established therein and heated in successive passes. The tube is prevented from ovalizing by beginning each pass with a portion bearing against a coaxial internal conical guide.

From European patent application EP 0,860,719 a process and apparatus are known for monitoring and controlling the ellipticity of preform tubes during Modified Chemical Vapour Deposition. In response to computer generated signals from the monitoring device, the tube collapse rate is adjusted dynamically by locally changing the temperature of the glass tube, or by changing the physical force acting to collapse the tube.

From US patent application US 2003/0024278 a method of fabricating an optical waveguide fibre from a preform having a centerline aperture is known, which method includes reducing the pressure in the centerline aperture, then increasing the pressure in the centerline aperture to a pressure in order to improve uniformity, circularity, and/or symmetry around the centerline aperture region.

One drawback of substrate tubes having deposited layer of glass on the inside surface thereof, for example manufactured according to prior art process using an internal vapour deposition process, is that the inner diameter of these tubes is unround, i.e. not round. In other words, the cross section of the remaining "open" section of the substrate tubes does not resemble a perfect circle.

After the completion of the internal vapour deposition process, a substrate tube with deposited glass is collapsed, usually on a dedicated machine therefor. A substrate tube not being circular, for example an oval tube, will result in a non-circularity of the core of the drawn optical fibre. The above stated non-circular effect obtained during deposition is even further enhanced during the collapsing process, as during collapsing there is not only a force acting towards the centreline of the substrate tube, i.e. centrally inwards, but there is also a force acting along the circumference of the substrate tube, i.e. axially. The axial force enhances the non-circularity property of the substrate tube.

The above results in a so-called "non-circularity" of the core of the optical fibre after drawing, which is an undesired phenomenon since it leads to increased attenuation.

Non-circularity may, for example, also lead to a single mode fibre having a high polarisation mode dispersion, or may lead to a multimode fibre exhibiting high differential mode delay values due to asymmetry in the core. Both are undesirable.

BRIEF SUMMARY OF THE INVENTION

It is an object of the present invention to provide for a method for manufacturing an improved optical preform, i.e.

a solid rod, wherein the non-circular property of the optical preform is reduced as compared to optical preforms prepared not according to the present method.

The above mentioned objects are achieved by the present invention.

The present invention provides a method for manufacturing an optical preform including the steps of: providing a substrate tube having deposited layers of glass on the inside surface thereof; increasing an outer diameter of the substrate tube by means of applying a traversing heat source to heat the substrate tube to above its softening temperature and by providing an internal pressure in the substrate tube higher than an ambient pressure; and collapsing the substrate tube, having an increased outer diameter, by means of applying the traversing heat source to heat the substrate tube to above its softening temperature such that an optical preform is manufactured.

In one embodiment, the method further includes the steps of measuring a difference in pressure between the internal pressure in the substrate tube and the ambient pressure, and controlling the internal pressure based on the measurement and a predefined pressure value.

In another embodiment, the predefined pressure value is between 10 and 100 Pascal.

In another embodiment, the predefined pressure value is between 30 and 65 Pascal.

In another embodiment, the predefined pressure value is between 40 and 50 Pascal.

In another embodiment, the predefined pressure value is around 45 Pascal.

In another embodiment, the temperature subjected to the substrate tube during the increasing step is at least 1900° C.

In another embodiment, the temperature subjected to the substrate tube during the collapsing step is at least 2000° C.

In another embodiment, the temperature subjected to the substrate tube during the collapsing step is at least 2100° C.

In another embodiment, the step of increasing the outer diameter of the substrate tube is performed multiple distinct times.

In another embodiment, the step of providing a substrate tube having deposited layers of glass on the inside surface thereof includes the steps of: providing a substrate tube; depositing glass layers on the inside of the substrate tube by: supplying glass-forming precursors to the hollow substrate tube via a supply side thereof, the hollow substrate tube further comprising a discharge side, and applying a traversing reaction zone inside the substrate tube along a length of the hollow substrate tube for the purpose of generating deposition conditions for said glass-forming precursors in the hollow substrate tube such that a substrate tube having deposited layers of glass on the inside surface thereof is provided.

In another embodiment, the step of depositing glass layers on the inside of the substrate tube uses a Plasma Chemical Vapour Deposition, PCVD, process.

BRIEF DESCRIPTION OF THE DRAWINGS

The above-mentioned and other features and advantages of the invention will be best understood from the following description referring to the attached drawings. In the drawings, like reference numerals denote identical parts or parts performing an identical or comparable function or operation.

DETAILED DESCRIPTION OF THE INVENTION

Figure 1:
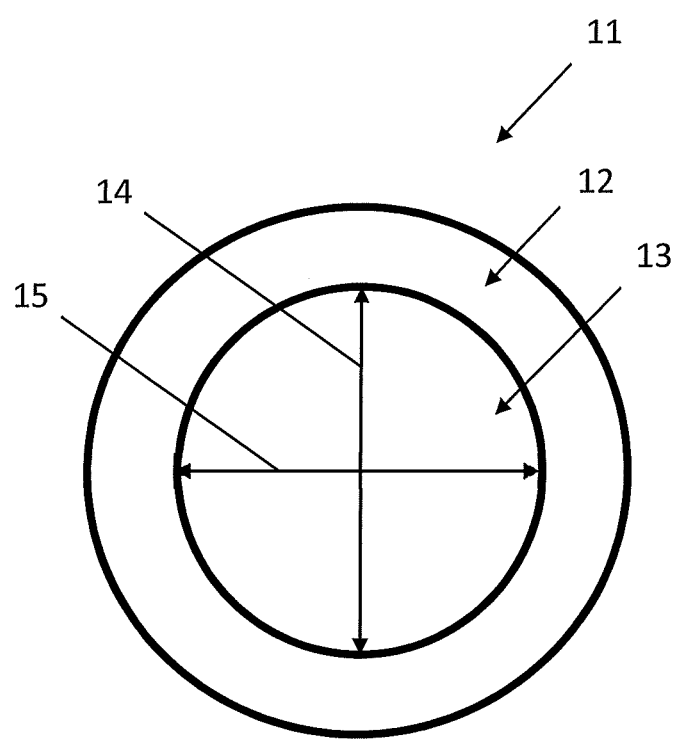
FIG. 1 illustrates an example of the quantitative measurement of the non-circularity of the core of a fibre.

The following definitions are used in the present description and/or claims to define the stated subject matter. Other terms not cited below are meant to have the generally accepted meaning in the field.

"hollow substrate tube" as used in the present description means: an elongated tube having a cavity within. Generally, the inside of said tube is provided (or coated) with a plurality of glass layers during the manufacturing of a preform.

"precursor for a primary preform" as used in the present description means: an intermediate product that will lead to a primary preform after one or more additional process steps.

"primary preform" as used in the present description means: a solid rod (solid preform) that requires to be externally provided with extra glass before it becomes a final preform.

"final preform" as used in the present description means: a solid rod (solid composite preform) that an be directly used for drawing of optical fibers therefrom.

"gas supply side" or "supply side" as used in the present description means: one side of the substrate tube, being an open end of the substrate tube that is used as inlet for the gases. The supply side is the side opposite to the discharge side.

"gas discharge side" or "discharge side" as used in the present description means: one side of the substrate tube, being an open end of the substrate tube that is used as outlet for the gases. The discharge side is the side opposite to the supply side.

"interior surface" as used in the present description means: the inside surface or inner surface of the hollow substrate tube.

"glass" or "glass material" as used in the present description means: crystalline or vitreous (glassy) oxide material—e.g. silica ($SiO_2$) or even quartz—deposited by means of a vapour deposition process.

"silica" as used in the present description means: any substance in the form of $SiO_x$, whether or not stoichiometric, and whether or not crystalline or amorphous.

"glass-forming gases" as used in the present description means: reactive gases used during the deposition process to form glass layers. These glass forming gases may comprise a precursor for a dopant. (e.g. $O_2$ and $SiCl_4$ and optionally others).

"reaction zone" as used in the present invention means: the zone or axial location wherein the glass-forming reaction or deposition takes place.

"reversal point" as used in the present description means: the axial point or position on the substrate tube at which the movement of the applicator reciprocates. In other words, changes from back to forth and forth to back. It is the turning point of the applicator. The axial point is measured at the middle (longitudinal) of the applicator.

"near the reversal point" as used in the present description means: an axial position on the substrate tube that is close in distance to the reversal point, or is the same position as the reversal point.

"at the reversal point" as used in the present description means: an axial position on the substrate tube that is the same position as the reversal point.

"moved back and forth" as used in the present description means: a reciprocating movement or moving backwards and forwards in a straight line.

The invention is not limited to the particular examples disclosed below or a particular method for manufacturing the optical preform.

The present invention does not require significant changes to the instrumental setup or devices/apparatus that are already in use. Therefore, the solution to the problem presented in the present invention is simple and cost-effective to implement.

The present invention relates, in a first aspect, to method for manufacturing an optical preform including the steps of: providing a substrate tube having deposited layers of glass on the inside surface thereof; increasing an outer diameter of the substrate tube by means of applying a traversing heat source to heat the substrate tube to above its softening temperature and by providing an internal pressure in the substrate tube higher than an ambient pressure; and collapsing the substrate tube, having an increased outer diameter, by means of applying the traversing heat source to heat the substrate tube to above its softening temperature such that an optical preform is manufactured.

As discussed above, a disadvantage of the prior art processes is that after the internal vapour deposition process the cross section of the remaining cavity inside of the substrate tube has a certain non-circularity. Said effect may be even further enhanced during the collapsing process according to the prior art.

As explained above, one of the objects of the present invention to provide for a method for manufacturing an improved optical preform, i.e. a solid rod, wherein the non-circular property of the optical preform is reduced.

The invention is based on the finding by the present inventors that, in case the outer diameter of the substrate tube having deposited glass layers on the inside thereof is increased by heating said substrate tube to above its softening temperature, and by providing an internal pressure in the substrate tube which internal pressure is higher than an ambient pressure, the cross section of the remaining "open" section of the substrate tube is made more round again. Due to the pressure inside the substrate tube, resulting in a force directed radially outwardly of the tube, the inner cross section of the remaining "open" section is made more round again. As such the cross section more closely resembles a perfect circle.

It should be noted that in the context of the present invention, with a substrate tube having deposited layers of glass in the inside surface thereof is meant a precursor for a primary preform. Said substrate tube comprises a plurality of deposited layers of glass. Said substrate tube can for example be obtained from a internal vapour deposition process, such as from an internal plasma deposition process, e.g. by means of PCVD.

In the context of the present invention, the internal pressure is the pressure inside the substrate tube during the collapsing treatment. The ambient pressure is the pressure surrounding the substrate tube. This ambient pressure can for example be the atmospheric pressure. During the increasing step, the substrate tube may be placed in a furnace for heating the substrate tube to above its softening temperature, wherein the ambient pressure surrounding the substrate tube, i.e. the pressure inside the furnace, may be different to the atmospheric pressure.

In any case, the inventors found out that the internal pressure in the substrate tube should be increased relative to the ambient pressure such that a force directed radially outwards from inside the substrate tube is generated, which force will result in that the cross section of the "open" section of the substrate tube increases and becomes more circular. Without wishing to be bound to any particular theory, the inventors believe that this effect is caused by the fact that softened glass prefers to revert to the state having the lowest tension, which is the circular state.

The softening temperature of the substrate tube, according to the present invention, is the temperature at which the substrate tube is heated to reach a viscosity below $10^{7.6}$ Poise.

The step of increasing the outer diameter of the substrate tube by heating the substrate tube to above its softening temperature is preferably performed by a traversing heat source that travels from one side of the substrate tube to the other in a certain speed. The speed is known to a skilled person and can for example be between 0.5 and 5, e.g. between 1 and 3, e.g. 2 centimeters per minute.

In an embodiment, the method further includes the steps of: measuring a difference in pressure between the internal pressure in the substrate tube and the ambient pressure; and controlling the internal pressure based on the measurement and a predefined pressure value.

The inventors noted that the internal pressure inside the substrate tube required to obtain the more circular effect of the substrate tube is relatively low. Hence a small increase in the ambient pressure could reduce the effect of the present invention. As such, by measuring the difference in pressure between the internal pressure in the substrate tube and the ambient pressure, and by ensuring that the internal pressure is such that the pressure difference is maintained, a maximum effect can be obtained. By controlling the internal pressure based on the measurement and a predefined pressure value, the internal pressure may be more accurately maintained at a desired level. The controlling can be carried out manually or preferably automatically by a pressure controller.

Further, a control mechanism as stated above has the further advantage that the results obtained are reproducible, i.e. each substrate tube, having a similar non-circularity, having its diameter increased according to the present invention should have the same or similar circular properties after the process according to the present invention.

The predefined pressure value, i.e. difference between internal pressure and ambient pressure, may be any value inputted by, for example, an mechanical engineer, software engineer, process engineer, or the like. Different types, such as a quartz-type tube, and qualities and/or thickness of substrate tubes may require different set point of the predefined pressure value. Further, the predefined pressure value may be amended during the process in case it is noted, or measured, that the circular property of the manufactured substrate tubes is not as desired.

In a preferred embodiment of the present invention, with the step "providing an internal pressure in the substrate tube higher than an ambient pressure" is meant providing a predefined pressure value that is a difference between the internal pressure in the substrate tube and an ambient pressure.

In another embodiment, the predefined pressure value is between 10 and 100 Pascal, i.e. between 0.1 and 1 millibar, preferably between 30 and 65 Pascal, more preferably between 40 and 50 Pascal, and even more preferably around 45 Pascal.

Preferably, the non-circularity of the substrate tube having deposited layers therein is maximally 2%, preferably maximally 1.5%, even more preferably maximally 1%. The non-circularity is measured by the following equation:

$$2(a-b)/(a+b)*100\%,$$

wherein a and b resemble the diameter of the core of the fibre at two orthogonal directions as shown in FIG. 1.

The inventors noted that even a small increase in the internal pressure of the substrate tubes between approximately 10 and 100 Pascal will result therein that the non-circularity of the manufactured optical preform is reduced with about 1 percent, calculated according to the above formula. In yet another embodiment, the temperature subjected to the substrate tube during the increasing step is at least 1900° C. and/or the temperature subjected to the substrate tube during the collapsing step is at least 2000° C., or even at least 2100° C.

In a further embodiment the step of increasing the outer diameter of the substrate tube is performed by providing a pulsating internal pressure in the substrate tube. In other words, the internal pressure may either be applied continuously during the step of increasing the diameter or it may be intermittently applied. In the case the internal pressure is intermittently applied, it may be applied with a certain frequency, e.g. pulsating. The frequency of the pulsing may be selected by a person skilled in the art and may for example be between 1 and 20 Hz.

In the context of the invention, the term "pulsating internal pressure" means that the internal pressure inside the substrate tube is pulsating around an averaged value. The average value of said pulsating internal pressure is then used as the value for the internal pressure. The advantage of using a pulsating pressure is that, at the same time, the substrate tube may be checked for any cracks or the like present in the glass deposited in the interior of the hollow substrate tube. This is done by measuring the pressure at the discharge side to observe if the same pulsing is observed at the discharge side that at the supply side where it is applied. If this is the case, there is no cracking in the tube which would lead to a leakage of the pressurized gas and hence to a loss of pulsing at the discharge side.

In another embodiment, the step of increasing the outer diameter of the substrate tube is performed multiple distinct times. During the process according to the present invention, the heat source is moved from the supply side to the discharge side (forward movement) and back from the discharge side to the supply side (backward movement). The present invention can be carried out in such a manner that the step of increasing is carried out only during one single forward movement. It is also possible that the step of increasing is carried out during one forward and one subsequent backward movement.

In an embodiment, the step of increasing is carried out during more than one forward and backward movement. In the latter case the internal pressure may be the same or different for each of these movements.

The collapsing step is usually carried out in several forward and backward movements, such as at least three forward and backward movements. During each of these movements the internal pressure may be the same or different and may be the same as the ambient pressure or may be different from the ambient pressure.

The present invention in principle adds an additional step to the prior art collapsing process. This will increase the time of the collapsing process. Moreover, since the increasing step increases the outer diameter of the substrate tube, the collapsing process that follows will take longer since a larger cavity has to be contracted. So there is a dual increasing effect on the duration of the collapsing process in total. This can be, partly, compensated for by increasing the temperature of the collapsing process in order to regain some of the time that is added due to the aforementioned effects.

The increase of the outer diameter of the substrate tube having deposited layers of glass on the inside surface thereof may be in the range of 1-6% after the increasing step In conventional situations the non-circular regularity of the core of the fibre is generally acceptable in case it is less than 2%. The present inventions have found that an increase of the outer diameter in the range of 1-6% is sufficient to substantially eliminate the non-circular effect of the conventional substrate tubes.

In a further embodiment, the step of providing a substrate tube having deposited layers of glass on the inside surface thereof including the steps of: supplying glass-forming precursors to a hollow substrate tube via a supply side thereof, the hollow substrate tube further comprising a discharge side; and applying a traversing heat source along a length of the hollow substrate tube for the purpose of generating deposition conditions for said glass-forming precursors in the hollow substrate tube such that a substrate tube having deposited layers of glass on the inside surface thereof is provided.

Usually, the internal vapour deposition process in performed in a different device than the collapsing process. As such, the step of providing the substrate tube having deposited layers of glass on the inside surface thereof may simply comprise the step of placing the substrate tube in the collapsing device. In another situation, the step of providing the substrate tube having deposited layers of glass on the inside surface thereof may comprise the vapour deposition process, wherein a hollow substrate tube is subjects to glass-forming precursors with the intention to deposit layers of glass on the inside surface thereof. This substrate tube is then transferred to a collapsing device.

A collapsing device suitable for manufacturing an optical preform, including increasing means arranged for increasing an outer diameter of a substrate tube having deposited layers of glass on the inside surface thereof, heating means, comprised in the collapsing device, and arranged for heating the substrate tube to above its softening temperature, pressure control means, comprised in the collapsing device, and arranged for providing an internal pressure in the substrate tube higher than an ambient pressure, and collapsing means arranged for collapsing the substrate tube by controlling the heating means to heat the substrate tube to above its softening temperature such than an optical preform is manufactured.

The collapsing device suitable for carrying out the present method may further include pressure measuring means arranged for measuring a difference in pressure between the internal pressure in the substrate tube and the ambient pressure, and pressure control means arranged for controlling the internal pressure based on the measurement and a predefined pressure value.

The collapsing device may further comprise rotating means arranged for rotating the substrate tube about its longitudinal axis. Hence in an embodiment of the present method, said substrate tube having deposited layers of glass in the inside surface thereof is rotated during the increasing step.

The above has the advantage that during the collapsing process, the axial forces inside the substrate tube are compensated for by the rotating spin caused by the rotating means.

FIG. 1 discloses an example of the quantitative measurement 11 of the non-circularity of the core of a fibre.

Here, the substrate tube is indicated with reference numeral 12, and the core of the tube is indicated with reference numeral 13.

In order to measure the non-circularity of the core, the diameter of the core should be measure in two orthogonal directions. In this case it would be a first diameter "a" 14 measured from the top side to the bottom side of the core 13, and a second diameter "b" 15 measured from the left side to the right side of the core 13. The non-circularity is then determined by the equation $2(a-b)/(a+b)*100\%$.

Figure 2:
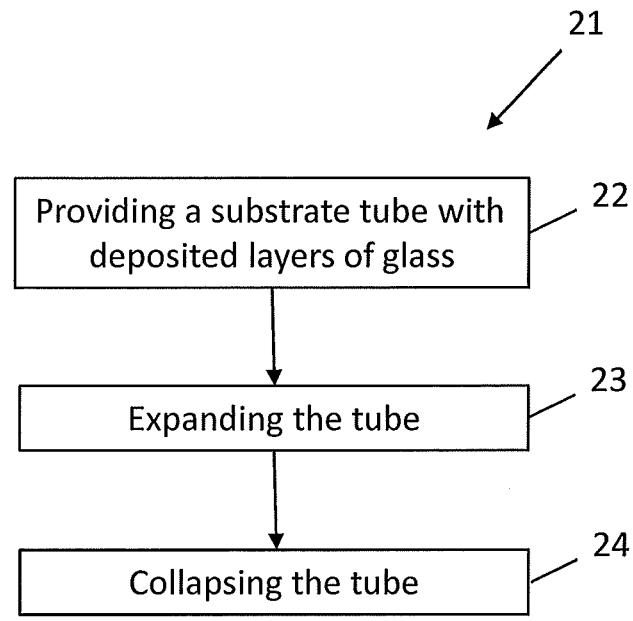
FIG. 2 is a flow chart illustrating the steps of a method according to the present invention.

FIG. 2 discloses an example of a flow chart 21 illustrating the steps of a method according to the present invention.

The method for manufacturing an optical preform in this specific embodiment includes the steps of providing a substrate tube having deposited layers of glass 22 on the inside surface thereof, increasing an outer diameter of the substrate tube 23 by means of applying a traversing heat source to heat the substrate tube to above its softening temperature and by providing an internal pressure in the substrate tube higher than an ambient pressure, and collapsing the substrate tube 24, having an increased outer diameter, by means of applying the traversing heat source to heat the substrate tube to above its softening temperature such that an optical preform is manufactured.

Figure 3:
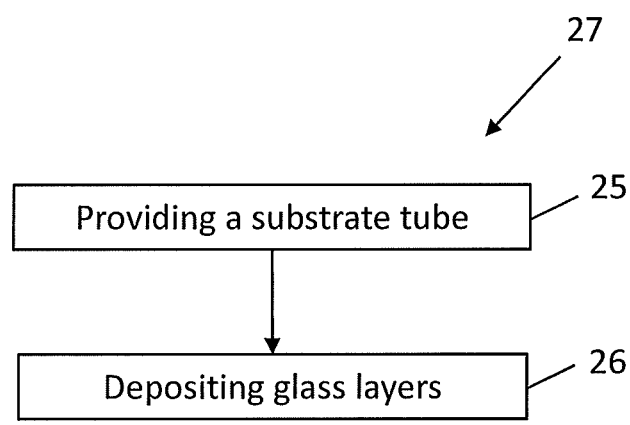
FIG. 3 is a flow chart illustrating in more detail the step of providing a substrate tube with deposited layers of glass, according to the present invention.

FIG. 3 discloses an example of another flow chart 27 illustrating in more detail the step of providing a substrate tube with deposited layers of glass, according to the present invention.

The step includes providing a substrate tube 25, depositing glass layers on the inside of the substrate tube 26 by supplying glass-forming precursors to the hollow substrate tube via a supply side thereof, the hollow substrate tube further comprising a discharge side, and applying a traversing reaction zone inside the substrate tube along a length of the hollow substrate tube for the purpose of generating deposition conditions for said glass-forming precursors in the hollow substrate tube such that a substrate tube having deposited layers of glass on the inside surface thereof is provided.

The present invention is not limited to the embodiments as disclosed above, and can be modified and enhanced by those skilled in the art beyond the scope of the present invention as disclosed in the appended claims without having to apply inventive skills.

The invention claimed is:

1. A method for manufacturing an optical preform, comprising the sequential steps of:
   (a) providing a substrate tube in a glass layer deposition device and depositing an entirety of layers of glass on an inside surface thereof and ceasing glass layer deposition;
   (b) after step (a) and prior to a collapsing step, providing the substrate tube of step (a) having the entirety glass layers deposited therein into a collapsing device and increasing an outer diameter of the substrate tube from 1% to 6% while reducing non-circularity of the substrate tube by applying a traversing heat source to heat the substrate tube to above a softening temperature thereof and by providing an internal pressure in the substrate tube higher than an ambient pressure while in the collapsing device, and
   (c) after step (b), collapsing the substrate tube of increased outer diameter by means of applying the traversing heat source to heat the substrate tube to above the softening temperature thereof such that an optical preform is manufactured.

2. The method according to claim 1, further comprising the steps of:
   measuring a difference in pressure between the internal pressure in the substrate tube and the ambient pressure, and
   controlling the internal pressure based on the measurement and a predetermined pressure value.

3. The method according to claim 2, wherein the predetermined pressure value is between 10 and 100 Pascal.

4. The method according to claim 2, wherein the predetermined pressure value is between 30 and 65 Pascal.

5. The method according to claim 2, wherein the predetermined pressure value is between 40 and 50 Pascal.

6. The method according to claim 2, wherein the predetermined pressure value is about 45 Pascal.

7. The method according to claim 1, wherein the temperature subjected to the substrate tube during the increasing step is at least 1900° C.

8. The method according to claim 1, wherein the temperature subjected to the substrate tube during the collapsing step is at least 2100° C.

9. The method according to claim 1, wherein the step of increasing the outer diameter of the substrate tube is performed a predetermined number of times.

10. The method according to claim 1, wherein step (a) comprises:
    providing a substrate tube;
    depositing glass layers on the inside of the substrate tube by:
    supplying glass-forming precursors to the hollow substrate tube via a supply side thereof, the hollow substrate tube further comprising a discharge side, and
    applying a traversing reaction zone inside the substrate tube along a length of the hollow substrate tube for the purpose of generating deposition conditions for the glass-forming precursors in the hollow substrate tube such that a substrate tube having the entirety of layers of glass deposited on the inside surface thereof is provided.

11. The method according to claim 10, wherein the step of depositing glass layers on the inside of the substrate tube uses a Plasma Chemical Vapour Deposition (PCVD) process.

\* \* \* \* \*